INVENTORS
S. LEE PASTOR
RUDOLPH A. ROM
CARL W. CLARAS
S. THEODORE WICKSTROM
MYRON ZARR
BY Carpenter Abbott
Coulter & Kinney
ATTORNEYS INVENTORS
S. LEE PASTOR
RUDOLPH A. ROM
CARL W. CLARAS
S. THEODORE WICKSTROM
MYRON ZARR
BY Carpenter Abbott
Coulter & Kinney
ATTORNEYS Sept. 28, 1965 S. L. PASTOR ETAL 3,208,682

SELF-THREADING MAGNETIC TAPE RECORDING AND REPRODUCING APPARATUS

Original Filed April 13, 1961 7 Sheets-Sheet 3

INVENTORS
S. LEE PASTOR
RUDOLPH A. ROM
CARL W. CLARAS
S. THEODORE WICKSTROM
MYRON ZARR
BY Carpenter, Abbott, Coulter & Kinney
ATTORNEYS INVENTORS
S. LEE PASTOR
RUDOLPH A. ROM
CARL W. CLARAS
S. THEODORE WICKSTROM
MYRON ZARR
BY Carpenter Abbott
Coulter & Kinney
ATTORNEYS INVENTORS
S. LEE PASTOR
RUDOLPH A. ROM
CARL W. CLARAS
S. THEODORE WICKSTROI
MYRON ZARR
BY Carpenter Abbott
Coulter & Kinney
ATTORNEYS Sept. 28, 1965 S. L. PASTOR ETAL 3,208,682

SELF-THREADING MAGNETIC TAPE RECORDING AND REPRODUCING APPARATUS

Original Filed April 13, 1961 7 Sheets-Sheet 6

INVENTORS
S. LEE PASTOR
RUDOLPH A. ROM
CARL W. CLARAS
S. THEODORE WICKSTROM
MYRON ZARR

BY Carpenter Abbott Coulter & Kinney
ATTORNEYS

INVENTORS
S. LEE PASTOR
RUDOLPH A. ROM
CARL W. CLARAS
S. THEODORE WICKSTROM
MYRON ZARR
BY Carpenter, Abbott, Coulter & Kinney
ATTORNEYS United States Patent Office 3,208,682

Patented Sept. 28, 1965

3,208,682

SELF-THREADING MAGNETIC TAPE RECORDING AND REPRODUCING APPARATUS

Sheldon Lee Pastor, St. Paul, Minn., Rudolph A. Rom, Berwyn, and Carl W. Claras, Western Springs, Ill., Svante Theodore Wickstrom, St. Paul, Minn., and Myron Zarr, Chicago, Ill., assignors to Minnesota Mining and Manufacturing Company, St. Paul, Minn., a corporation of Delaware Continuation of application Ser. No. 102,804, Apr. 13, 1961. This application Feb. 19, 1964, Ser. No. 349,525

16 Claims. (Cl. 242—55.12)

This application is a continuation of our copending application Serial No. 102,804, filed April 13, 1961, now abandoned.

This invention relates to improvements in self-threading magnetic tape recording and reproducing apparatus. Recent developments in the art of recording and reproducing intelligence by the use of magnetic tape have been in the direction of self-threading cartridge type recorder-reproducers which are a marked advance over prior manually threaded apparatus.

The recorder-reproducer units heretofore developed, however, have been rather complicated and expensive, and have not been entirely satisfactory because of their susceptibility to malfunction of the type requiring the attention of an experienced technician or serviceman. In prior units such malfunction could be caused by a defective cartridge or tape as well as by a defect in the apparatus itself. Service calls are a source of expense and annoyance to the user and reflect upon the manufacturer of the recorder-reproducer, whatever the cause.

The present invention has for a principal object the provision of an improved self-threading magnetic tape recording and reproducing apparatus having novel means for threading magnetic tape from a supply reel along a predetermined transport path to a take-up reel, said apparatus being so constructed and arranged that most malfunctions caused by a defective tape can be readily overcome by simply rewinding the tape onto the supply reel.

Another object of the invention is to provide an improved apparatus of the aforementioned character which utilizes a relatively stiff normally straight leader connected to the outer or free end of the tape and adapted to be wound on the supply reel with the tape, there being novel drive-out means frictionally engageable with said leader on said supply reel for driving said leader through guiding means therefor along said predetermined path toward the take-up reel, the latter being provided with means for effecting winding engagement of said leader thereon when the leading end of said leader arrives at said take-up reel.

A further object of the invention is to provide an improved apparatus of the class described wherein the leader has a width substantially greater than that of the tape and the guiding means engages opposite edge portions of the leader to guide the same along a predetermined first transport path spaced from a magnetic head, said guiding means permitting transverse movement of the tape to a second transport path in operative association with said magnetic head upon advance of the leader out of engagement with said guiding means.

Another object of the invention is to provide an improved apparatus of the class described having embodied therein a novel take-up reel and means cooperable with said reel for sensing winding engagement of said leader on said take-up reel, said means coacting mechanically with the leader to generate an actuating force effective to trigger or release holding means permitting movement of associated parts from threading to playing position.

Still another object of the invention is to provide an improved magnetic tape recording and reproducing apparatus for automatically threading, playing and rewinding a selected magnetic tape, and which is operable at the will of an operator to automatically recycle, said apparatus being relatively simple and inexpensive in construction, efficient in operation, durable and otherwise well adapted for the purposes described.

While the inventive concept has particular utility in the field of magnetic recording, and in the illustrated embodiment the supply reel forms part of a cartridge, the broader aspects of the invention are not so limited, it being intended that the expression "tape" where used in the specification and claims include not only magnetic tape as such, but also other elongated extents of limp or flexible sheet, web or film material which it may be desired to thread along a predetermined path from a supply reel or roll to a take-up reel or roll.

Objects and advantages of the invention other than those specifically enumerated will become apparent as the description proceeds, reference being had to the drawings accompanying and forming a part of this specification, wherein.

Figures 1, 2, 3:
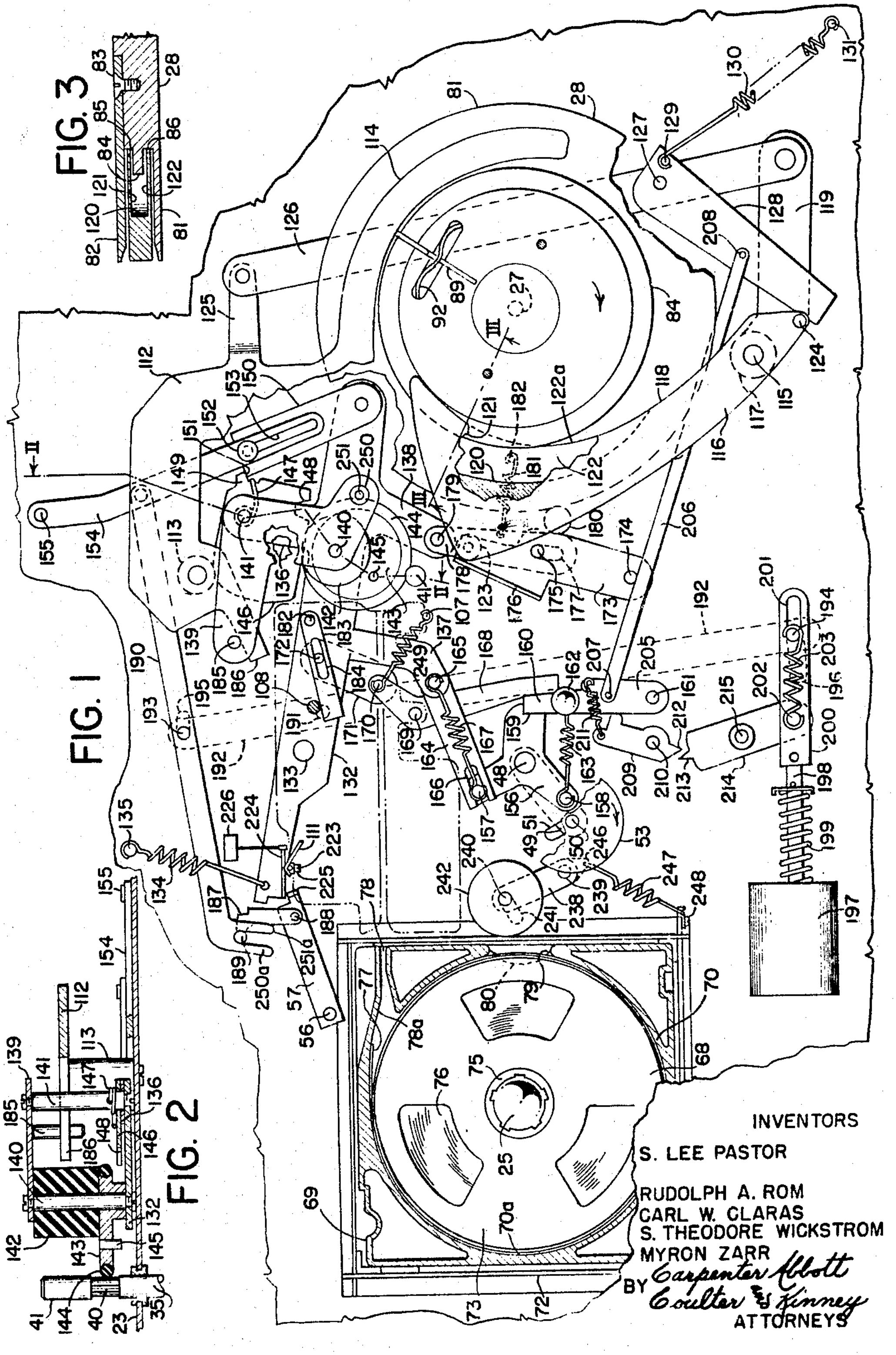
FIGURE 1 is a plan view of a tape recording-reproducing apparatus constructed in accordance with the principles of the present invention with the parts thereof disposed in "off" position, the tape and leader guide means, magnetic heads, tape pressure pad and the take-up reel cover plate being removed.
FIGURE 2 is a fragmentary vertical sectional view taken along the line II—II of FIGURE 1.
FIGURE 3 is a fragmentary vertical sectional view taken along the line III—III of FIGURE 1.
Figures 4, 5, 6:
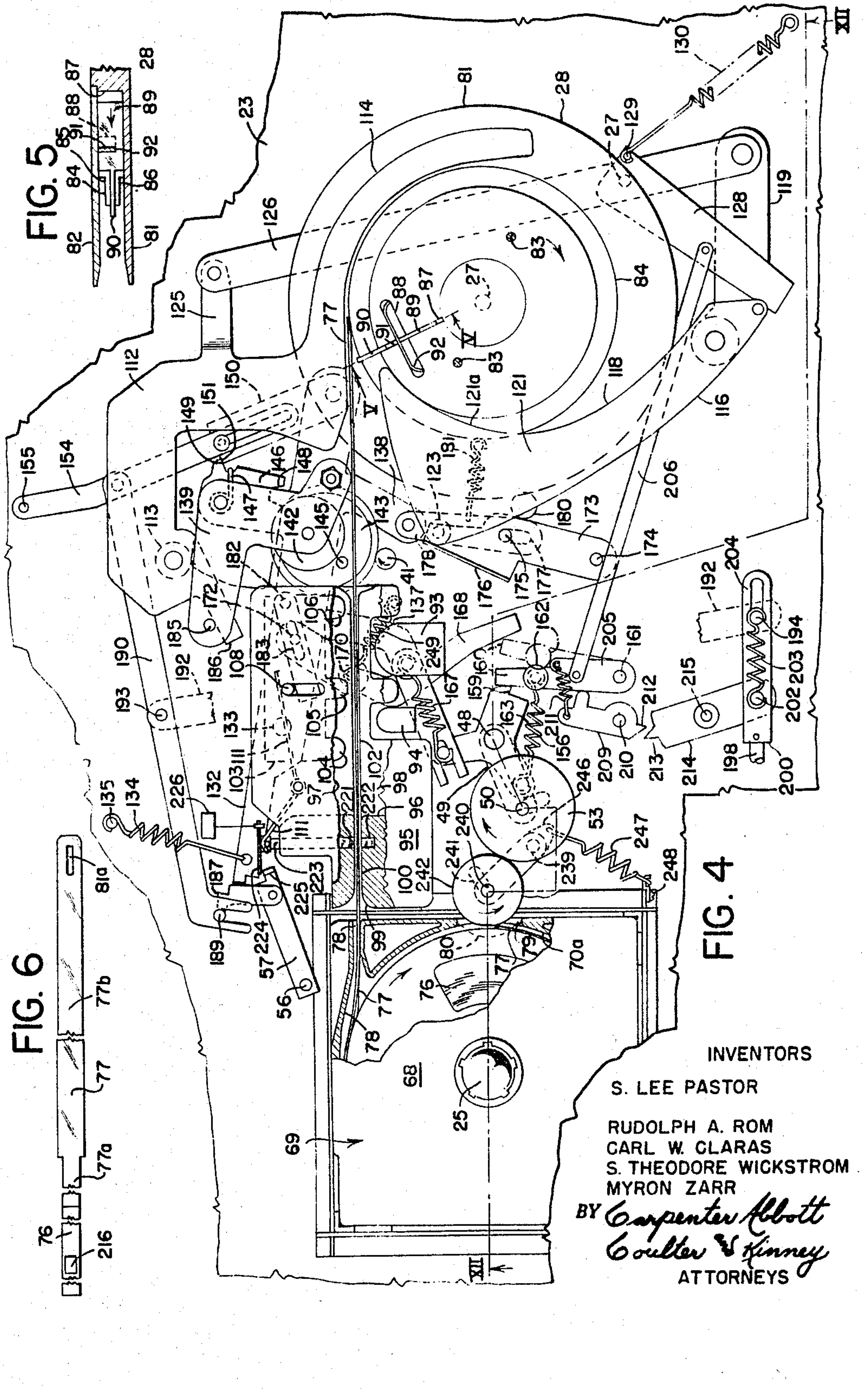
FIGURE 4 is a plan view similar to FIGURE 1 with the parts thereof disposed in "drive-out" position and the leader advanced to the take-up reel in position for winding engagement therewith. The tape and leader guide means, magnetic heads and pressure pad being shown in this view.
FIGURE 5 is a fragmentary vertical sectional view taken along the line V—V of FIGURE 4.
FIGURE 6 is a fragmentary elevational view of a magnetic tape and attached leader for use in the apparatus of the present invention.
Figure 11:
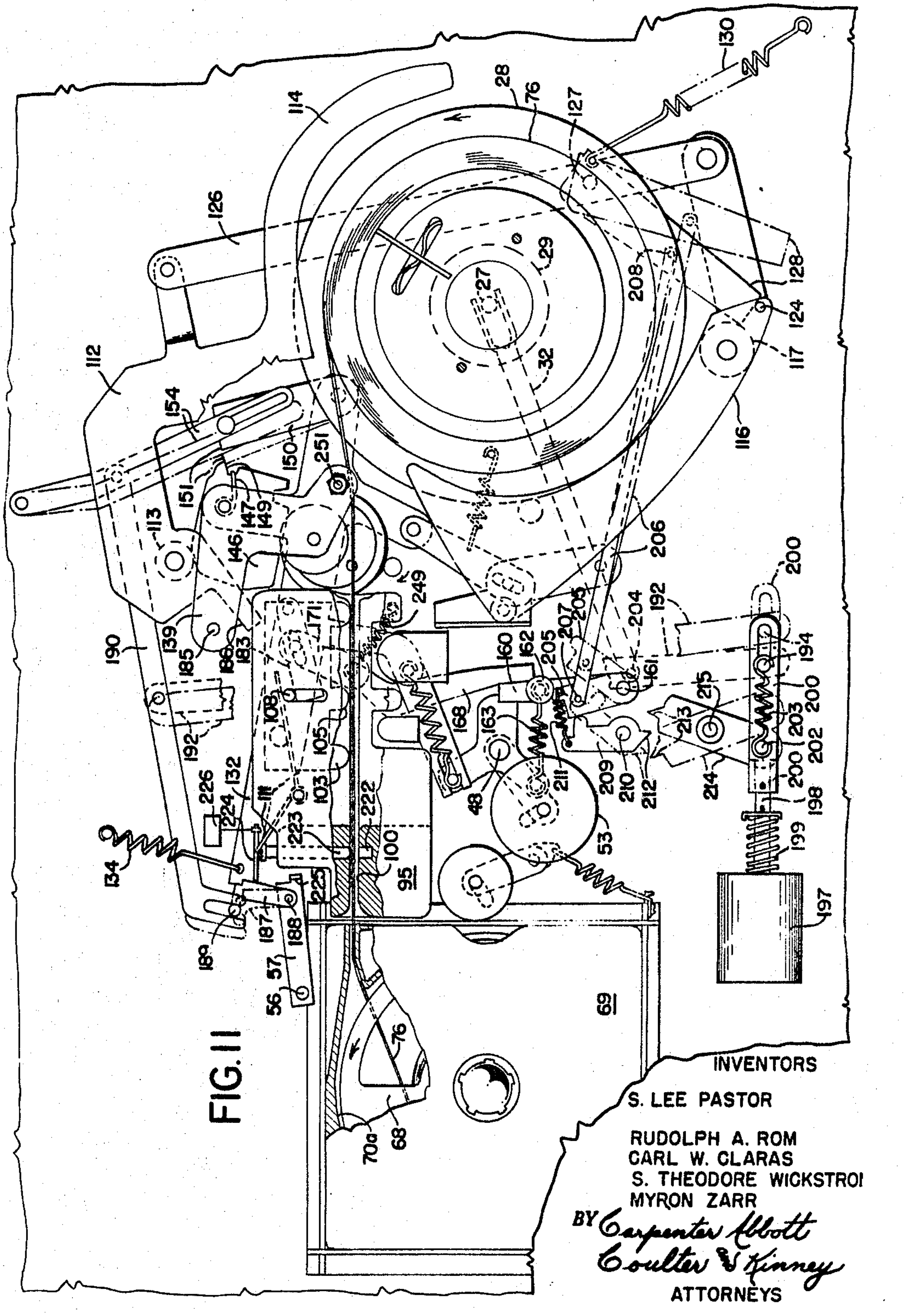
FIGURE 11 is a plan view similar to FIGURE 4 showing the parts of the apparatus in "rewind" position, there being shown in dot and dash lines the positions to which certain parts are moved at the end of the rewind cycle for return of the parts to "off" position in FIGURE 1.
Figures 12, 15, 16:
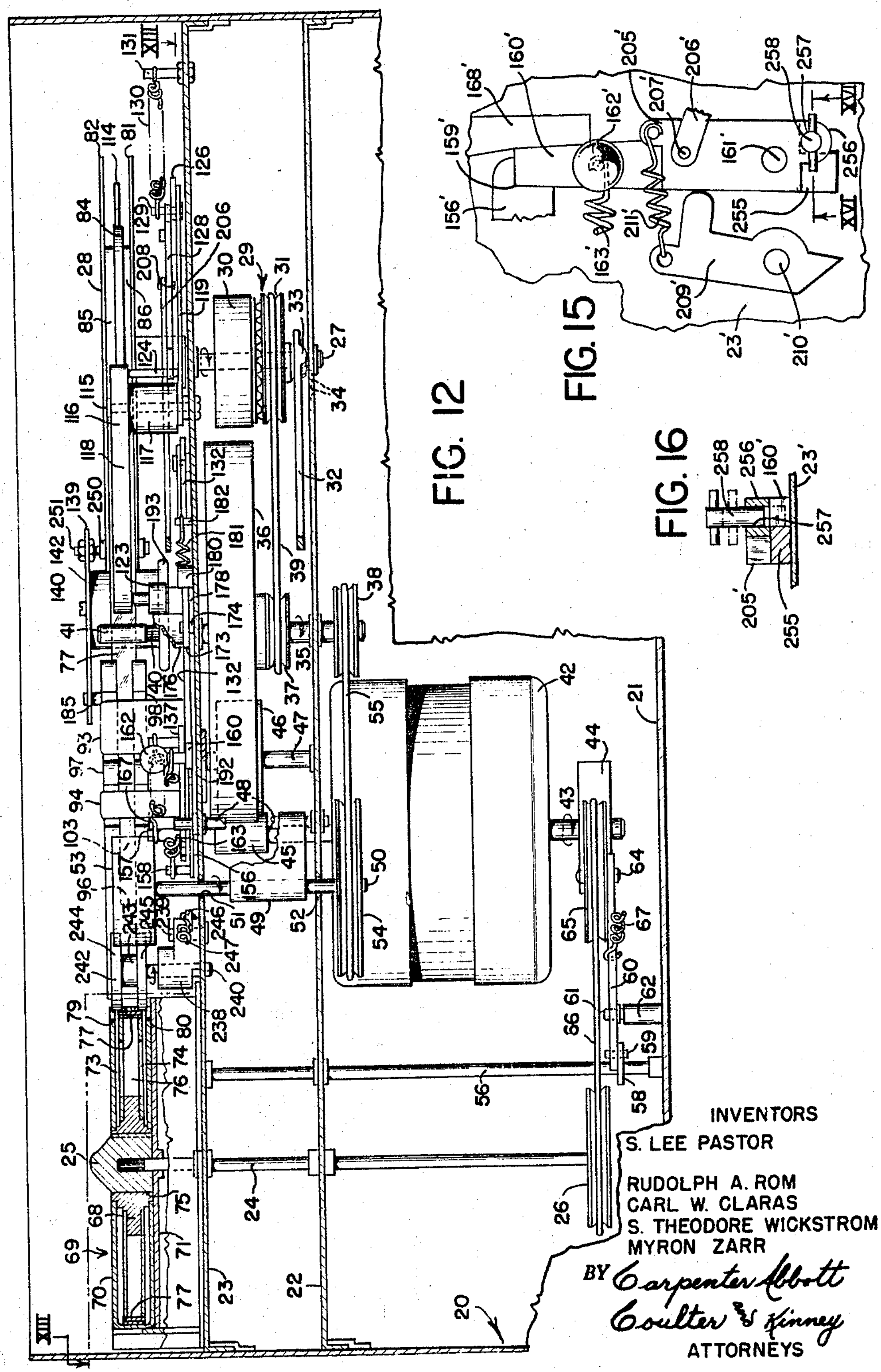
FIGURE 12 is a vertical sectional view of the improved recorder-reproducing apparatus taken generally along the line XII—XII of FIGURE 4.
FIGURE 15 is a fragmentary plan view of another form of recorder-reproducer.
FIGURE 16 is a fragmentary vertical sectional view taken along the line XVI—XVI of FIGURE 15.
Figures 13, 14:
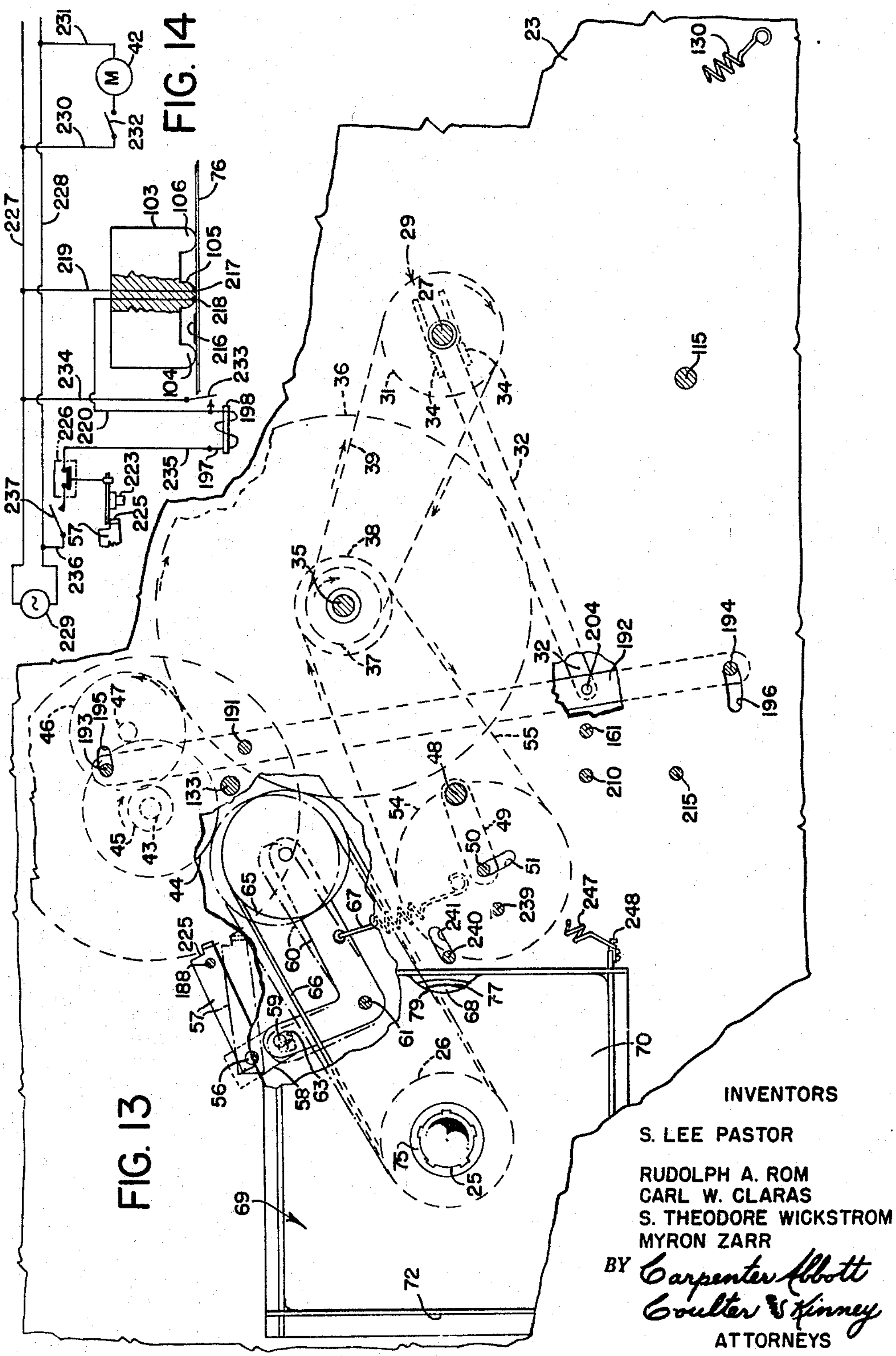
FIGURE 13 is a sectional plan view taken along the line XIII—XIII of FIGURE 12, parts being broken away to expose the rewind drive control linkage, the "rewind" position thereof being shown in dot and dash lines.
FIGURE 14 is a semi-diagrammatic view showing an electrical circuit for the improved recorder-reproducer.

Referring now to FIGURES 1, 4, and 12 of the drawing, the illustrated magnetic tape recording and reproducing apparatus comprises a generally rectangular chassis 20 (FIGURE 12) comprising a lower deck 21, intermediate deck 22 and an upper deck 23. The decks 22 and 23 are provided with suitable bearings for the support of a vertical supply reel spindle or shaft 24 which terminates at its upper end in a cylindrical axially ribbed head 25 and at its lower end in a pulley 26. The decks 22 and 23 are also provided with suitable bearings for a vertical take-up reel shaft 27 which has a take-up reel 28 fixed thereon above the deck 23. Between the decks 22 and 23, the shaft 27 is provided with a clutch mechanism 29 including a member 30 fixed to said shaft and a pulley 31 freely rotatable thereon and vertically slidable with respect thereto. The clutch 29 is actuated by a member 32 having a bifurcated end portion, the arms of which straddle the shaft 27 (as shown in FIGURES 11, 12 and 13) and are formed with cam surfaces 33. In the position shown in FIGURE 12, the member 32 holds the pulley 31 lifted into frictional driving engagement with the member 30. Movement of the member 32 to the left as viewed in the drawing permits the cam portions 33 to drop into recesses 34 formed in the deck 22, thereby permitting pulley 31 to drop out of driving engagement with the member 30.

A vertical shaft 35 is mounted in suitable bearings in the decks 22 and 23, and has a fly wheel 36 and a pulley 37 fixed thereon between the decks 22 and 23, there being a pulley 38 fixed thereon below the deck 22. An endless belt 39 drivingly connects the pulleys 37 and 31. Above the deck 23 the shaft 35 is formed with a knurled portion 40, and above the portion 40, said shaft terminates in a capstan 41 which may be slightly larger in diameter than the knurled portion 40 as shown most clearly in FIGURE 2.

Suitably mounted below the deck 22 is a double-ended drive motor 42 having a vertical drive shaft 43. The lower end of the shaft 43 has a drive wheel 44 fixed thereon, and the upper end of said shaft has a cylindrical driving head 45 fixed thereon above the deck 22. The wheel 44 and head 45 may be of metal and the surface thereof may be knurled. An idler wheel 46 preferably made of rubber-like material is carried by a shaft 47 mounted at its opposite ends in suitable bearings carried by the decks 22 and 23. The idler wheel 46 is positioned in frictional engagement with the peripheries of both the driving head 45 and the fly wheel 36. As viewed from above and as shown in FIGURE 13, the motor 42 drives the wheel 44 and head 45 clockwise to cause counterclockwise rotation of the idler wheel 46 and clockwise rotation of the fly wheel 36, shaft 35, capstan 41 and pulleys 37 and 38. When the clutch 29 is engaged, clockwise rotation is imparted to the shaft 27 and take-up reel 28.

A vertical shaft 48 is mounted in suitable bearings in the decks 22 and 23 and has a supporting arm 49 fixed thereto between said decks. The arm 49 rotatably carries a shaft 50 at the outer end thereof, said shaft projecting through arcuate slots 51 and 52 in the decks 23 and 22 respectively. A drive roller 53, for example of rubber-like material, is fixed on the upper end of the shaft 50, and a pulley 54 is fixed on the lower end of said shaft. An endless belt 55 drivingly connects the pulleys 38 and 50 so that clockwise rotation is imparted to the pulley 54 and drive roller 53 as viewed from above.

As shown in FIGURES 12 and 13, a vertical shaft 56 is mounted in suitable bearings in the decks 21, 22 and 23 and has an arm 57 fixed to its upper end above the deck 23. At its lower end the shaft 56 has an arm 58 fixed thereto, said arm carrying a pin 59. Coacting with the arm 58 is a crank arm 60 which may have a vertical pivot shaft 61 mounted in a suitable bearing 62 on deck 21. One arm of the crank 60 is slotted, as at 63 to receive the pin 59, and the other arm of said crank carries a vertical stub shaft 64 on which a pulley 65 is rotatably mounted. An endless belt 66, for example of rubber, drivingly connects the pulleys 26 and 65. A spring 67 has one end connected to the crank 60 and has its other end suitably anchored, said spring being effective to bias said crank, the pulley 65 and arm 57 to the positions thereof shown in solid lines in FIGURE 13. Clockwise movement of the arm 57 to the dot and dash line position thereof shown in FIGURE 13 is effective through the pin and slot connection 59, 63 to pivot the chank 60 counterclockwise against the bias of spring 67 and thereby bring the portion of the belt 66 on the pulley 65 into frictional engagement with the periphery of the drive wheel 44. Such engagement causes counterclockwise rotation of the pulley 65 as well as of pulley 26, spindle 24 and head 25.

Removably mounted on the head 25 of the spindle 24 is a supply reel 68. In the embodiment of the invention illustrated, the supply reel 68 forms part of a cartridge 69 of the type disclosed and claimed in the copending application of Briskin et al., Serial No. 102,805 filed April 13, 1961, and assigned to the assignee of the instant application. The cartridge 69 comprises a shallow rectangular container 70, for example of clear plastic, within which the reel 68 is rotatably mounted, said cartridge being disposed upon a platform 71 (FIGURE 12) within a rectangular well 72, the platform being so disposed that the supply reel 68 is in the same horizontal plane as the take-up reel 28.

The illustrated supply reel 68 has apertured circular side flanges 73 and 74, for example of metal, fixed to a centrally bored hub 75, the bore of which is formed with a plurality of axial grooves complemental with the ribs on the spindle head 25 to provide a driving connection between said head and reel 68. A relatively limp magnetic tape 76 is wound on the hub 75 between the flanges 73 and 74 of reel 68, and fixed to the free end of said tape is a relatively stiff normally straight leader 77 (FIGURE 6) having a trailing end 77a of the same width as tape 76, the major portion 77b thereof having a width greater than the spacing between the reel flanges 73 and 74 and adapted to be wound on the peripheries of said flanges as shown most clearly in FIGURES 1 and 12 when the cartridge 69 is not in use.

An example of one type of magnetic recording tape which is satisfactory for use in the improved apparatus is one in which the backing or carrier film takes the form of tensilized polyethylene terephthalate .0005 inch thick and .150 inch wide. Polyethylene terephthalate is marketed commercially under the trademark "Mylar." The leader 77 may be made of polyethylene terephthalate .010 inch thick, the portion 77a being .150 inch wide and the portion 77b being .238 inch wide.

The container 70 is formed with a cylindrical inner wall surface 70a of a diameter affording sufficient clearance for accommodation of the leader 77 wound on the flanges 73 and 74. An edge opening 78 is formed in the container 70 for passage therethrough of the leader 77 and tape 76, and wall surface 78a extends from the opening 78 into tangency with the surface 70a as shown to afford means for guiding the leader 77 through the opening 78 upon clockwise rotation of the reel 68 as will hereinafter appear. The container 70 is also formed with preferably two spaced edge openings 79 and 80 which extend into adjacent portions of the container side walls to expose the adjacent peripheral portions of the reel flanges 73 and 74 as well as the leader 77 wound thereon for a purpose to be described hereinafter.

An arm 238 (FIGURES 1 and 12) is mounted adjacent the well 72 for pivotal movement about a fixed pivot pin 239 and carries a vertical stub shaft 240, the lower end of which extends through a suitable slot 241 in deck 23, and the upper end of which carries a drive-out roller 242 preferably of rubber-like material. As shown in FIGURE 12, the illustrated drive-out roller 242 has a central portion 243 of reduced diameter defining spaced upper and lower roller portions 244 and 245. As shown in FIGURE 12, the upper and lower drive-out roller portions are adapted to enter the edge openings 79 and 80 of the cartridge 69 for engagement with the leader 77 wound on the periphery of the spool 68 during a drive-out operation. The arm 238 is formed with a tab 246 to which one end of a spring 247 is connected, the other end of said spring being anchored, as at 248. The spring 247 biases the arm 238 in a clockwise direction toward the position thereof shown in FIGURE 1, the limit of such movement being defined by engagement of the lower end of shaft 240 with one end of the slot 241. The drive-out roller 242 is positioned in the path of the driving roller 53 and is movable against the bias of the spring 247 to the "drive-out" position thereof shown in FIGURES 4 and 12 by movement of the roller 53 to the position thereof shown in FIGURE 4.

As shown most clearly in FIGURES 3 and 12, the take-up reel 28 in the illustrated embodiment has an integral peripheral flange 81 at one side thereof, and forming a corresponding peripheral flange at the other side thereof is an annular plate 82 removably fixed to said reel as by screws 83. In FIGURES 1, 4, 7 to 9 and 11, the plate 82 is removed to facilitate the disclosure. The flanges 81 and 82 are spaced apart a distance somewhat greater than the width of the leader 77. The reel 28 is also formed with an integral annular flange or rib 84 of rectangular cross-section spaced from the flanges 81 and 82 to provide circumferential grooves 85 and 86. Referring to FIGURES 4 and 5, the supply reel is formed with a radial slot 87 intermediate the flanges 81 and 82 and extending from the central portion thereof to the periphery of the annular rib or flange 84. The reel 28 is also formed with an elongated cut-out portion 88 intersecting the slot 87. A pawl 89 of flat stock is slidable in the slot 87 and has an elongated narrow tip portion 90 which is narrower than the circumferential rib 84 and is also narrower than the aperture 81*a* formed in the end of the leader 77. The pawl 89 is formed with a slot 1 to receive a leaf spring 92 which is also disposed within the cutaway portion 88 and lightly biases said pawl radially outwardly toward the position thereof shown in FIGURES 4 and 5.

Interposed between the supply reel 68 and take-up reel 28, and more specifically between the well 72 and the capstan 41, are a magnetic record-playback head 93 and an erase head 94. Adjacent the heads 93 and 94 the improved apparatus is provided with means defining a predetermined threading path for the leader 77 extending from the cartridge opening 78 to the take-up reel 28 and spaced from the heads 93 and 94, said means also permitting travel of the magnetic tape along a predetermined second path in operative relation with respect to the heads 93 and 94 upon winding of the leader 77 on the take-up reel 28. In the illustrated embodiment, the aforementioned means comprises a generally rectangular leader and tape guide member 95 formed with a central cutaway portion 96 extending inwardly from the right hand end thereof to define similar upper and lower horizontal plate portions 97 and 98 respectively which are spaced apart a distance greater than the width of the magnetic tape 76 but less than the width of the leader 77. The spacing between and the alinement of plate portions 97 and 98 is such as to limit vertical edgewise movement of the tape and to insure proper alinement thereof with the heads 93 and 94 as the tape passes the heads. The member 95 is formed adjacent the edge opening 78 of the cartridge 69 with a flared opening 99 which merges into a narrow rectangular opening 100 having a width slightly greater than that of the leader 77. The plate portions 97 and 98 are formed in their adjacent surfaces with rectangular grooves 101 and 102 respectively (FIGURE 10), forming continuations of the opening 100 as shown in FIGURE 4.

Figures 7, 9, 10:
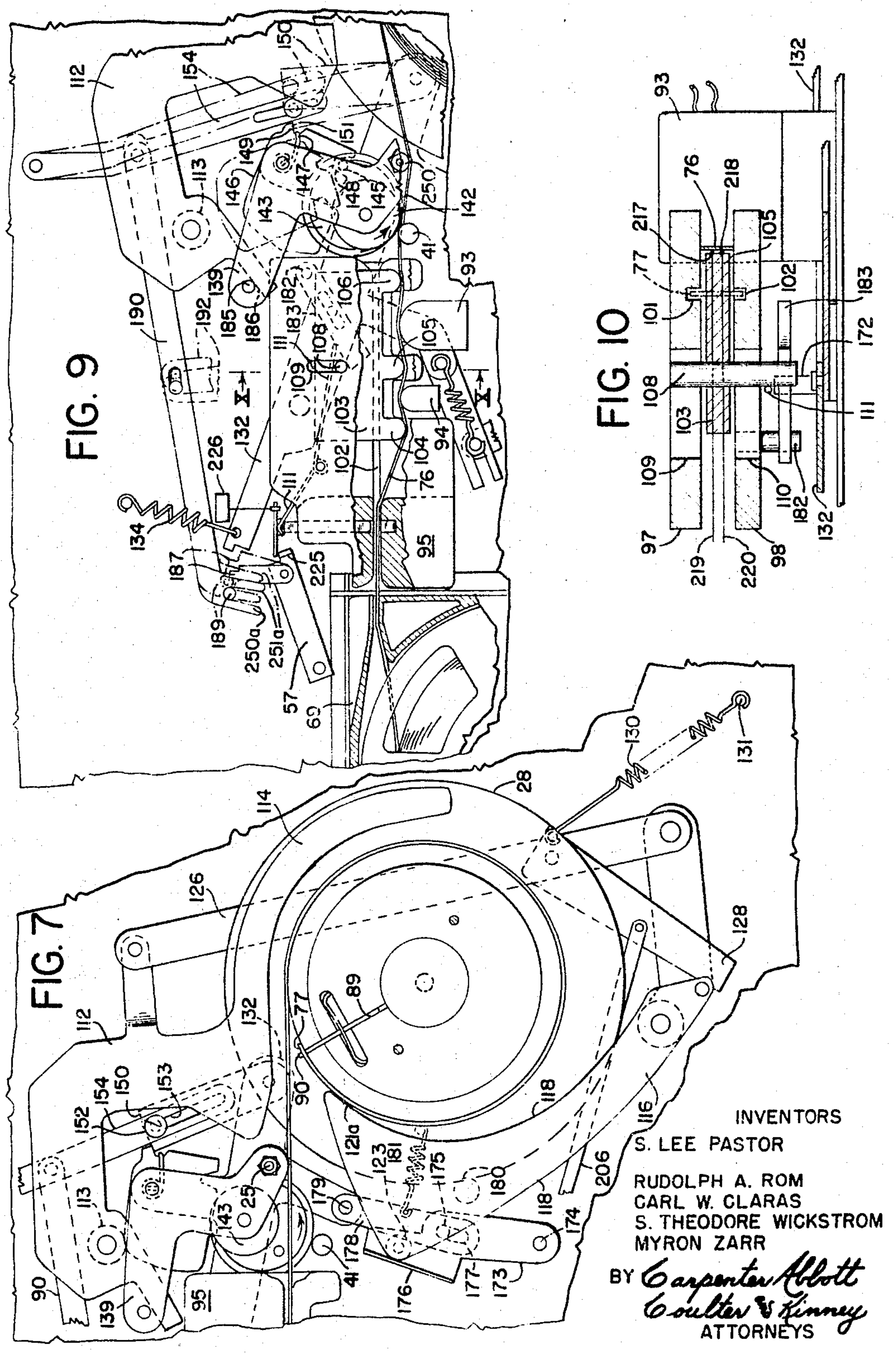
FIGURE 7 is a fragmentary plan view similar to FIGURE 4 showing the coaction of the leader sensing arm with the associated parts upon winding engagement of the leader on the take-up reel.
FIGURE 9 is a fragmentary plan view similar to FIGURE 8, showing the parts in "play" or "record" position, there being shown in dot and dash lines the positioning of certain parts necessary to initiate a subsequent rewind operation.
FIGURE 10 is a fragmentary cross sectional view taken along the line X—X of FIGURE 9.

As best shown in FIGURES 4, 9 and 10, a generally rectangular flat pressure pad member 103, for example of nylon or other suitable low friction electrical insulating material, is slidably mounted between the plate portions 97 and 98 and is formed with rounded projections 104, 105 and 106 on the side thereof facing the magnetic heads 93 and 94, the projection 105 being interposed between said heads. The pressure pad 103 (FIGURE 10) carries a pin 108, the upper end of which travels in a slot 109 formed in the upper plate 97 and the lower end of which projects through a similar slot 110 formed in the lower plate 98. A suitably mounted torsion spring 111 (FIGURE 4) engages the pin 108 to bias the pad 103 toward the advanced or operative position thereof shown in FIGURES 9 and 10), said pad being movable against the bias of the spring 111 to the retracted position thereof shown in FIGURE 4, wherein the projections 104, 105 and 106 thereof are disposed on the side of the grooves 101 and 102 opposite the heads 93 and 94.

Figure 8:
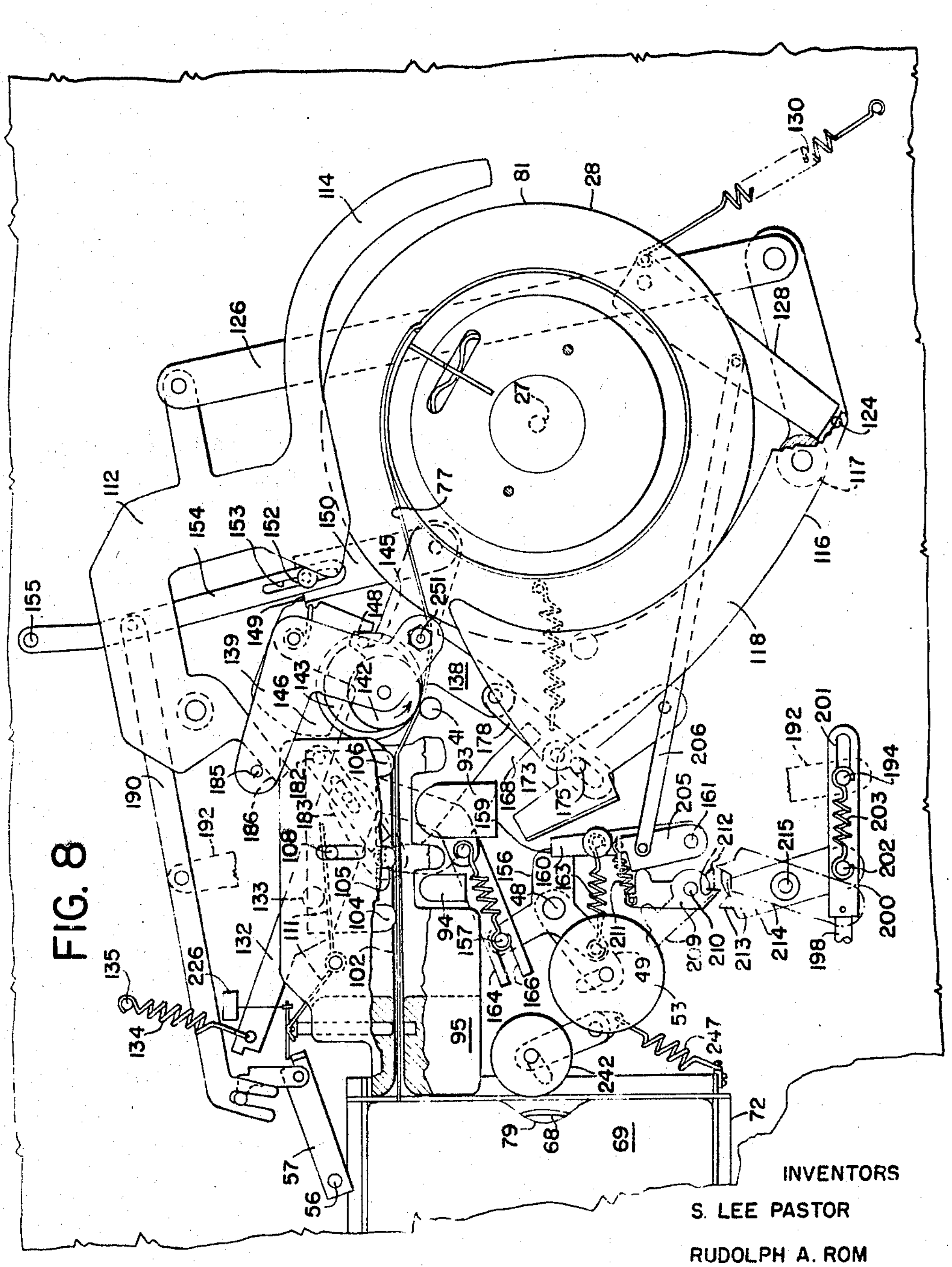
FIGURE 8 is a fragmentary plan view similar to FIGURE 4 showing the positions to which the parts move following sensing of winding engagement of the leader on the take-up reel.

Referring now to FIGURES 1 and 2, an irregularly shaped, generally flat member 112 is pivotally mounted, for example on a cylindrical pedestal 113 and has an arcuate leader guiding portion 114 movable in the plane of the annular rib 84 of take-up reel 28 from a position in engagement with said rib, as in FIGURE 1, to the retracted position thereof shown in FIGURES 8 and 11. Mounted for pivotal movement on a vertical stud 115, is a bell crank lever 116 comprising a bushing 117 (FIGURE 12), a horizontal leader sensing arm 118 and a horizontal arm 119. The arm 118 is generally arcuate in shape and is adapted to fit freely between the flanges 81 and 82 of take-up reel 28. The arm 118 is formed in the edge thereof facing the take-up reel with a cutaway portion 120 (FIGURES 1 and 3) defining horizontal flange portions 121 and 122 having a thickness to permit free movement thereof within the annular slots 85 and 86 of the take-up reel 28 as shown most clearly in FIGURE 3. The arcuate inner edges of flanges 121 and 122 define cam surfaces 121*a* and 122*a*, respectively (FIGURE 1), for a purpose which will hereinafter appear. Depending from the arm 118 is a roller 123 (FIGURE 12) for a purpose to be hereinafter described.

A portion of the arm 118 extends beyond the bushing 117 and with the arm 119 provides mounting means for a vertical pin 124. The member 112 has an integral arm 125 having a horizontal terminal portion offset downwardly into the plane of the crank arm 119. A link 126 has its opposite ends pivotally connected to the arms 119 and 125, as shown, and pivoted to the link 126, as at 127, is a latch member 128. A spring 130 is fixed at one end to a pin 129 carried by the latch 128 and is suitably anchored at its other end, for example to a fixed pin 131. It will be observed that the spring 130 not only biases the latch member 128 in a clockwise direction about pin 127, but it also biases the members 112 and 116 clockwise about the pivots 113 and 115 respectively toward the positions thereof shown in FIGURE 1 wherein the arm 114 engages the periphery of the annular rib 84 of the take-up reel 28, and the flanges 121 and 122 of arm 118 are disposed within the slots 85 and 86 of said reel.

As shown most clearly in FIGURE 1, an irregularly shaped generally flat horizontal control member 132 is mounted on a fixed pin 133 for pivotal movement in a horizontal plane and is biased in a clockwise direction by a spring 134 connected to the left hand end thereof and suitably anchored as at 135. The control member 132 is formed with an arm 136 projecting from one side thereof and arms 137 and 138 projecting from the other side thereof. Spaced above the control member 132 is a generally Z-shaped horizontal plate 139 which is supported by a pair of vertical studs 140 and 141 (FIGURE 2), the stud 140 having its lower end fixed to the main body portion of the control member 132 and the stud 141 having its lower end fixed to the outer end of the arm 136 of said control member. The plate 139 carries a tape and leader guiding roller 250 (FIGURE 12) which is rotatably mounted on a pin 251 depending from the end of said plate adjacent the stud 140. Plate 139 also carries an actuating pin 185 which depends from the other end thereof for a purpose which will hereinafter appear.

Rotatably mounted on the stud 140 is a pressure roller 142 of rubber-like material, adapted for coaction with the capstan 41 as will hereinafter appear. Also mounted on the stud 140 below the pressure roller 142 is an eccentric circular cam member 143 having a concave peripheral surface in which an O-ring 144 of rubber-like material is snugly received, said O-ring being cooperable with the knurled surface 40 of the capstan shaft 35 as will hereinafter appear. The pressure roller 142 and cam 143 are in relatively rotatable slidable frictional engagement such that rotation of one tends to similarly rotate the other. The cam 143 carries a depending pin 145, and the stud 141 rotatably carries a cam and latching plate 146 cooperable with said pin. A torsion spring 147 is also carried by the stud 141 and biases the plate 146 in a clockwise direction. The plate 146 is formed with a notch 148 in one edge thereof and is also formed with a projecting shoulder portion 149.

As shown most clearly in FIGURE 1, the right hand end of the control member 132 has one end of a horizontal link 150 pivotally connected thereto, said link having a shoulder 151 for coaction with the shoulder 149 of the plate 146. Link 150 carries a pin 152 slidably positioned within a slot 153 formed in one end of horizontal arm 154, the other end of which is connected to a fixed pivot 155.

Fixed to the vertical shaft 48 above the deck 23 is a three-armed crank and latch member 156, two arms of which have pins 157 and 158 fixed thereto respectively and the third arm of which is formed with an L-shaped cut-out 159 providing a latching shoulder cooperable with a latch member 160 pivotally mounted on a fixed pin 161. The latch member 160 carries a pin 162, the upper end of which is enlarged as shown in FIGURE 12 to facilitate manual engagement. A helical tension spring 163 connects the pins 158 and 162. A link 164 has one end pivotally connected to the arm 137 of control member 132 as by a pin 165, the other end of said link being slotted as at 166 to slidably receive the pin 157. A helical tension spring 167 connects the pins 157 and 165 as shown. When the control member 132 is in the retracted position shown in FIGURE 1, the spring 167 exerts substantial clockwise biasing force on the crank and latch member 156. The spring 163 exerts a light counterclockwise biasing force on the crank and latch member 156 and at the same time exerts the same light biasing force on the latch member 160, biasing the latter toward the left to the latched position shown in FIGURE 1.

As will hereinafter appear, the coaction of the eccentric cam 143 with the knurled portion 40 of the capstan shaft 35 provides means for effecting retractile, i.e. counterclockwise, movement of the control member 132 against the bias of the spring 134 toward the retracted position thereof shown in FIGURE 1 from the advanced position thereof shown, for example, in FIGURES 8 and 9. Conversely, the coaction of the cam 143 with shaft portion 40 limits the rate of advancing movement of the control member 132.

First and second releasable holding or latching means are provided for retaining the control member 132 in its retracted position when moved thereto. One of said releasable holding means takes the form of an over-center toggle mechanism comprising a bell crank lever 168 mounted on a fixed pivot pin 169. One arm of the lever 168 is elongated and is engageable with the latch member 160, and the other arm thereof carries an over-center pin 170 pivotally connected to one end of a link 171. The other end of link 171 is pivotally connected to a pin 172 carried by the control member 132. The pin 172 projects upwardly from the control member 132 as shown in FIGURE 10, for a purpose which will hereinafter appear. It will be observed that in FIGURE 1 the over-center pin 170 is positioned to the right of a line connecting the pins 169 and 172, and that since the elongated arm of the crank lever 168 abuts the latch member 160, the lever 168 and link 171 when so disposed afford a stable rigid structure preventing advancing or clockwise movement of the control member 132. A tension spring 249 has one end attached to the pin 170 and has its other end suitably anchored, as to a fixed pin 107, said spring being operable to exert a light bias tending to rotate the crank lever 168 in a clockwise direction toward the position thereof shown in FIGURE 1. The aforementioned holding means is releasable to permit advancing movement of the control member 132 under the bias of the spring 134 by over-center movement of the pin 170 which can be effected by counterclockwise rotation of the crank lever 168, for example to the position thereof shown in FIGURE 4.

The other of the aforementioned releasable holding or latching means takes the form of an over-center toggle linkage comprising a link 173 pivoted at one end on a fixed pin 174 and carrying an over-center pin 175. The link 173 is formed with an upstanding flange 176 engageable by the depending roller 123 carried by the leader sensing arm 118 as shown most clearly in FIGURE 12. The over-center pin 175 is slidably disposed within a slot 177 formed in one end of a link 178 having its other end pivotally connected to the arm 138 of the control member 132 as by pin 179. The link 178 is lightly biased counterclockwise toward engagement with a stop member 180 by a spring 181 anchored to a fixed pin 182. It will be observed that the links 173 and 178 when in the position shown in FIGURE 1 afford a stable rigid structure preventing advancing movement of the control member 132, since the over-center pin 175 is to the right of a line connecting the pins 174 and 179, and the links 173 and 178 abut the stop 180. This holding means is releasable to permit advancing movement of the control member 132 under the bias of the spring 134 by over-center movement of the pin 175 which can be effected by counterclockwise movement of the link 173, for example to the position thereof shown in FIGURE 7.

Means is provided for effecting movement of the pressure pad 103 from the advanced or operative position thereof shown in FIGURE 9 to the retracted position thereof shown in FIGURE 4 with retractile movement of the control member 132. To this end, a pin 182 depends from the plate 98 (FIGURE 10) and pivotally supports a lever 183 (see also in FIGURE 1) which is slotted as at 184 to slidably receive the pin 172 projecting upwardly from the control member 132. It is apparent that upon retractile movement of the control member 132, the pin 172 causes clockwise movement of the lever 183 which engages the portion of the pin 108 depending from the pressure pad 103 to effect retractile movement of said pressure pad against the bias of the spring 111. Conversely, upon advancing movement of the control member 132, the lever 183 is swung counterclockwise to permit advancing movement of the pressure pad under the bias of the spring 111.

Advancing movement of the control member 132 is also effective to actuate the guiding and sensing assembly comprising the member 112, link 126 and crank arm 116. For this purpose the member 112 is formed with a projection 186 which is disposed in the path of advancing movement of the depending pin 185 carried by the Z-shaped plate 139, such that said pin, by engagement with said projection, causes counterclockwise pivotal movement of the member 112 about its pivot 113. Through the link 126 this movement of member 112 causes simultaneous counterclockwise pivotal movement of the crank arm 116, all against the bias of the spring 130. Upon movement of the parts of the guiding and sensing assembly to the position of FIGURE 8, as a result of advancing movement of the control member 132 to its position in said figure, the pin 124 clears the end of the latch member 128 and said latch member is moved by the bias of spring 130 to latched position against the bushing 117 as shown in FIGURE 8. Such latching movement of the latch 128 makes a rigid structure of the guiding and sensing assembly so that the arms 114 and 118 thereof will remain in the spread position shown in FIGURE 8 until the latch member 128 is subsequently released or unlatched to effect collapse of said assembly and return of the parts thereof to the position of FIGURE 1 under the bias of a spring 130.

Means is provided for rendering the rewind drive mechanism shown in FIGURE 13 operative responsive to retractile movement of the control member 132, and said means comprises a latch member 187 (FIGURE 1) which is pivoted to the arm 57, as by a pin 188, said latch member carrying a pin 189. An actuating arm 190 is pivotally connected at one end to the arm 154 and is formed with a laterally directed bifurcated opposite end portion comprising spaced generally parallel fingers 250*a* and 251*a* embracing the pin 189 as shown. As shown in FIGURE 9, when the control member 132 is in its advanced position, the latch member 187 can be moved by the arm 190 to the dot and dash line position thereof wherein said latch member is in the path of the adjacent end of the control member 132 such that upon retractile movement of the latter the latch member 187 is engaged thereby and, along with the arm 57, is moved to the position thereof shown in FIGURE 11. The position of arm 57 in FIGURE 11 is the same as the dot and dash line position thereof in FIGURE 13, and as aforedescribed, movement of the arm 57 to this position effects operation of the rewind drive. The rewind drive, when thus rendered operative, can be rendered inoperative by movement of the member 190 toward the left to thereby disengage the latch 187 from control member 132 as shown in dot and dash lines in FIGURE 11. With the latch 187 disengaged the parts of the rewind mechanism return, under the bias of the spring 67, to the initial inoperative position thereof shown in solid lines in FIGURE 13.

As shown most clearly in FIGURES 1, 12 and 13, an elongated horizontal lever 192 is mounted on the underside of the deck 23 for pivotal movement on a fixed pin 191. At its opposite ends the lever 192 carries vertical pins 193 and 194 which extend through suitable openings 195 and 196, respectively, in the deck 23 as shown most clearly in FIGURE 13. The pin 193 affords a pivotal connection between the lever 192 and the arm 190 (FIGURE 1). Mounted on the deck 23 adjacent the pin 194 is a solenoid 197 having a plunger 198 biased to the projected position thereof shown in FIGURE 1 by a compression spring 199. In the illustrated embodiment, plunger 198 is provided with a head 200 slotted as at 201 to receive the pin 194. The head 200 carries a pin 202, and a spring 203 connects the pins 194 and 202 to normally maintain the pin 194 in engagement with the left hand end of the slot 201. Energization of the solenoid 197 causes movement of the plunger 198 toward the left against the bias of the spring 199 to the position thereof shown in FIGURE 11 to thereby move the lever 192 from the dot and dash line position thereof to the dash line position thereof both shown fragmentarily in FIGURE 11. As shown in FIGURES 11 and 13, the clutch actuating lever 32 is pivotally connected to the lever 192 at 204, so that the clutch 29 is disengaged by energization of the solenoid 197 and movement of the lever 192 to the dash line position thereof shown in FIGURE 11. Conversely, the clutch 29 is re-engaged by return of the lever 192 to its initial position upon de-energization of the solenoid 197.

Means is provided for effecting unlatching of the latch member 128 upon de-energization of the solenoid 197 and return of the head thereof from the solid line position of FIGURE 11 to the dot and dash line position thereof. To this end, a relatively short arm 205 is pivotally mounted on the fixed pin 161, and an elongated link 206 has one end pivotally connected to the arm 205 at 207 and its other end pivotally connected to the latch member 128 at 208. A sear member 209 is pivotally mounted on a fixed pin 210 adjacent the pin 161, and a light spring 211 connects the member 205 and sear 209 to normally maintain the sear in abutment with the member 205 as shown. The sear 209 is formed with a pointed tip portion 212 and is positioned in the path of a pointed tip 213 formed on a lever 214 pivotally mounted on a fixed pin 215. The end of the lever 214 opposite the tip 213 is pivotally connected to the pin 202 carried by the solenoid plunger head 200.

FIGURE 8 illustrated in dot and dash lines the positions to which the lever 214 and sear 209 are moved by energization of solenoid 197, it being apparent that the sear 209 is moved counterclockwise against the light bias of the spring 211 and away from the lever 205. Once the tip portion 213 of lever 214 clears the tip 212 of sear 209, the spring 211 returns the sear to the solid line position thereof shown. FIGURE 11 shows the solenoid 197 energized and the lever 214 in the corresponding energized position. The dot and dash lines in FIGURE 11 indicate the position to which the lever 214, sear 209, arm 205, link 206 and latch 128 are moved by return of the solenoid plunger 198 to de-energized position under the bias of the plunger spring 199. During such return movement, the tip 213 of lever 214 engages the tip 212 of sear 209, rotating said sear, and thereby the arm 205 to the dot and dash line position shown in FIGURE 11. Such movement of the arm 205, acting through link 206, swings the latch member 128 to the released dot and dash line position thereof shown in FIGURE 11 whereupon the sensing and guiding assembly collapses as aforedescribed. When the tip 213 of lever 214 clears the tip 212 of the sear, said sear, arm 205, link 206 and latch 128 return to the positions thereof shown in FIGURE 1 under the bias of the spring 130.

Means is provided for sensing the transport of a predetermined length of the tape 76 past the heads 93 and 94 in a forward or playing direction during a playing cycle and for sensing substantially complete rewinding of the tape 76 and leader 77 into the cartridge 69 during a rewind operation. One of said sensing means comprises an electrically conductive layer 216 (FIGURES 6 and 14) on the tape 76 near the inner or trailing end thereof, i.e. the end opposite the leader 77. As shown in FIGURES 10 and 14, the pressure pad 103 carries in the surface of the projection 105 thereof a pair of exposed spaced electrical contacts 217 and 218 provided with flexible leads 219 and 220 respectively. When the metallic layer 216 moves past and in engagement with the exposed contacts 217 and 218, it electrically bridges said contacts.

Referring to FIGURE 4, in order to provide the other of said sensing means, the guide member 95 is formed with a rectangular bore 221 intersecting and extending beyond the opening 100, there being a portion 222 of the bore 221 on the opposite side of said opening. Axially slidable in the bore 221 is a rectangular plunger 223 of low friction material such as nylon which is biased inwardly toward the opening 100, for example by an arm of the spring 111, and has a width approximately that of the tape 76. The plunger 223 carries a head portion 224 positioned for engagement by an upstanding projection 225 on the arm 57, so that when the parts are in the position shown in FIGURES 1, 4, 8 and 9, the plunger 223 is held retracted from the opening 100 against the bias of the spring 111. Suitably connected to the head 224 is a normally closed microswitch 226, the contacts of which are closed except when the plunger 223 is moved to its innermost position wherein the tip thereof is disposed in the bore portion 222.

FIGURE 14 illustrates electrical circuitry for the improved apparatus in which line conductors 227 and 228 are connected to a suitable source 229, for example of alternating current. The motor 42 is connected across the lines 227 and 228 by a circuit including conductors 230 and 231, and which also may include a suitable manual switch 232. As shown, the lead 219 is connected to the line conductor 227 and the lead 220 is connected to one terminal of the solenoid 197. The solenoid 197 is provided with a switch 233 affording holding contacts, said switch being in the open circuit position shown when the solenoid plunger 198 is in its de-energized position shown in FIGURE 1 and being moved to closed circuit position by movement of the plunger 198 to its energized position shown in FIGURE 11. One terminal of the switch 233 is connected to the terminal of solenoid 197 to which the lead 220 is connected, and the other terminal of said switch is connected to the line conductor 227 by a conductor 234. The other terminal of the solenoid 197 is connected by a conductor 235 to one terminal of the microswitch 226, and the other terminal of said microswitch is connected to the line conductor 228 by a conductor 236 which may have a suitable manual switch 237 interposed therein.

*Operation*

At the beginning of a playing cycle the parts of the improved apparatus are disposed in the "off" position shown in FIGURE 1 wherein the control member 132 is retracted, the drive-out roller 242 is retracted, the solenoid 197 is de-energized, the clutch 29 is engaged, and the guiding and sensing assembly comprising the member 112 and crank 116 is in collapsed guiding and sensing position. A cartridge 69 having the magnetic tape 76 and leader 77 contained wholly within the container 70 thereof is placed in operative position in the well 72 as shown in FIGURE 1. Advancing movement of the control member 132 is prevented by the over-center toggle mechanism comprising link 171 and crank 168, as well as by the over-center toggle mechanism comprising the links 173 and 178. Closure of the motor switch 232 (FIGURE 14) causes operation of the motor 42 which, in turn, causes clockwise rotation of the take-up reel 28, capstan 41 and roller 53 through the drive system shown most clearly in FIGURE 13. Switch 237 (FIGURE 14) is also closed at the beginning of the cycle.

To initiate a threading, playing and rewind cycle, the knob 162 is grasped manually and moved toward the right to move the latch member 160 therewith from the latched position thereof shown in FIGURE 1 to the released position thereof shown in the dot and dash lines in FIGURE 4. One immediate effect of such movement of the latch 160 is to cause over-center movement of the toggle pin 170 to release the toggle mechanism comprising the link 171 and crank 168. Another immediate effect of such latch movement is to permit clockwise rotation of the three-armed member 156 and similar movement of shaft 48 and arm 49 under the bias of the spring 167, thereby causing movement of the roller 53 to the "drive-out" position thereof shown in FIGURE 4. During movement of the roller 53 from its position of FIGURE 1 to its "drive-out" position, said roller engages the drive-out roller 242 and forces the latter leftward from its retracted or inoperative position of FIGURE 1 to its operative or "drive-out" position of FIGURE 4 against the bias of the spring 247. Upon manual release of the knob 162, said knob and latch member 160 return to the position thereof shown in solid lines in FIGURE 4 under the light bias of the spring 163. As shown most clearly in FIGURE 12, when the drive-out roller 242 is in "drive-out" position, the spaced roller portions 244 and 245 thereof extend into the edge openings 79 and 80 of the cartridge container 70 and frictionally engage the outer surface of the outermost convolution of the leader 77 wound on the peripheries of the flanges of the supply reel 68.

The clockwise rotation of the roller 53 imparts counterclockwise rotation to the drive-out roller 242, and the frictional engagement of the drive-out roller with the leader 77 pushes said leader in the direction to cause clockwise rotation of the reel 68. Since the leader 77 is normally straight, the free end thereof moves in contact with the inner cylindrical surface 70_a_ of container 70 and is guided toward the edge opening 78 by the guiding surface 78_a_. Continued rotation of the drive-out roller 242 causes the leader 77 to be projected from the cartridge opening 78 into the tapered mouth 99 of the opening 100 in the leader and tape guide member 95. As the leader emerges from the right hand end of the opening 100, opposite edge portions thereof enter the grooves 101 and 102 of the upper and lower plate portions 97 and 98 as shown in dot and dash lines in FIGURE 10, and said grooves guide the leader along a substantially straight line path past and in spaced relation with respect to the magnetic heads 93 and 94. Upon emerging from the right hand end of the grooves 101 and 102, the normally straight leader 77 passes in spaced relation between the capstan 41 and pressure roller 142 and thence between the flanges 81 and 82 of the take-up reel to the position shown in FIGURE 4.

In the illustrated embodiment, the portion 77_b_ of the leader 77 is of such length that simultaneously with the arrival of its leading end at the take-up reel in a position such as that shown in FIGURE 4, the trailing end of said leader portion moves out of frictional engagement by the drive-out roller 242, so that said drive-out roller is no longer effective to push the leader. This insures that once the leading end of the leader 77 arrives at a position such as that shown in FIGURE 4 wherein it is engageable by the take-up reel pin 90, no further projection of the leader from the cartridge takes place.

With the tip of the leader 77 positioned at the take-up reel, for example as shown in FIGURE 4, clockwise rotation of the take-up reel moves the pin 90 into the aperture 81_a_ in the end of said leader to initiate winding engagement of said leader on the take-up reel 28 as said pin exerts a pull on the leader and draws the same around the periphery of the bead 84. The pin 90 projects through the aperture 81_a_ and engages the inner edge surface of the arcuate arm portion 114 of the member 112, and the coaction thereof insures positive pickup of the leader by said pin. As the leader 77 is drawn around the periphery of the bead 84, it is moved into engagement with the adjacent edge or cam surfaces 121_a_ and 122_a_ of the flanges 121 and 122, and the coaction of the leading end of the leader with said cam surfaces pivots the sensing arm 118, and thereby the sensing and guiding assembly comprising crank 116 and member 112, to the position thereof shown in FIGURE 7 as the tip of the leader moves to the position shown in said figure. The arm 118 thus senses winding engagement of the leader 77 on the take-up reel 28, and the coaction of the leader with the cam surfaces 121_a_ and 122_a_ generates a force which overcomes the bias of the springs 130 and 181 in moving the parts to the position of FIGURE 7. During movement of the arm 118 to the position of FIGURE 7, roller 123 depending therefrom, by its engagement with the flange 176, causes leftward over-center movement of the pin 175 of the toggle linkage comprising links 173 and 178.

Both toggle linkages or holding means are now in released position, and the control member 132 is therefore free to advance or pivot clockwise about its pivot 133 under the bias of the spring 134. Such advance takes place at a controlled rate, however, since the bias of the spring 134 urges the eccentric cam 143 into engagement with the knurled portion 40 of the capstan shaft 35 (FIGURE 2), and the advancement of said control member is dependent upon the rate at which the eccentric cam 143 is rotated counterclockwise by the shaft portion 40. Rotation of the cam 143 as described permits advancement of the control member 132 as well as movement of the guide roller 250 and pressure roller 142 into engagement with the leader 77, moving the portion of the leader engaged therewith to the position of FIGURE 8 wherein said leader is pressed against the capstan 41 by the pressure roller 142. As the pressure roller 142 engages the capstan 41 and is rotated thereby, the eccentric cam 143 moves out of driving engagement with the knurled portion 40 on the capstan shaft and the cam 143 is rotated by its frictional engagement with the pressure roller to move the pin 145 depending from said cam into the notch 148 in the cam and latch plate 146. Thereafter, the friction between the pressure roller 142 and the cam 143 tends to cause further counterclockwise rotation of said cam as the pressure roller continues to be rotated, but such cam rotation is prevented by engagement of the pin 145 in the notch 148.

Advance of the control member 132 to the position of FIGURE 8 is accompanied by sliding movement of the pin 152 on link 150 within the slot 153 in the link 154. Advance of the control member 132 also causes the depending pin 185 carried by the Z-shaped plate 139 to engage the projection 186 and actuate the sensing and guiding assembly comprising member 112 and crank 116 to the spread or retracted position thereof shown in FIGURE 8 whereupon the latch 128 moves to the latching position shown in said figure under the bias of the spring 130. Advance of the control member 132 to the position thereof shown in FIGURE 8 has the further effect of swinging the slotted pressure pad actuating lever 183 counterclockwise about its pivot 182 out of the path of the pressure pad pin 108 to thereby permit the pressure pad 103 to move into engagement with the leader 77 under the bias of the spring 111.

During advance of the control member 132 toward the position thereof shown in FIGURE 8, the arm 137 thereof moves toward the pin 157 to bring the closed end of the slot 166 of link 164 into engagement with said pin and rotate the three-armed plate 156 counterclockwise to the position of FIGURE 8, permitting the bias of the spring 163 to return the latch 160 to latched position with respect to the shoulder 159 as shown. Shaft 48 and arm 49 rotate counterclockwise with the plate 156 to move the drive roller 53 out of engagement with the drive-out roller 242, whereupon said drive-out roller returns to the retracted or inoperative position thereof shown in FIGURE 8 under the bias of the spring 247.

The leader 77 is drawn from the supply reel 68 and wound on the take-up reel 28 at a rate controlled by the coaction of the pressure roller 142 with the capstan 41. As the trailing end of the leader portion **77*b* leaves the right hand end of the leader guiding grooves 101 and 102, the pressure pad 103 under the bias of the spring 111, presses the leader portion 77*a* and the magnetic tape 76 transversely from the path defined by the grooves 101 and 102 toward and into engagement with the magnetic heads 93 and 94 as shown most clearly in FIGURES 9 and 10 illustrating the "play" or "record" position of the parts wherein the tape 76 is in operative relation with said heads. The parts of the improved apparatus normally remain in the position shown in FIGURE 9 until a predetermined length of or substantially all of the tape 76 has been transported from the supply reel 68 to the take-up reel 28, at which time the metallic layer 216 on the tape 76 (FIGURES 6 and 14) engages and electrically bridges the contacts 217 and 218 carried by the pressure pad 103. This completes the electrical circuit from the line conductor 227 through leads 219 and 220, conductor 235, switches 226 and 237 and conductor 236 to the line conductor 238 and causes energization of the solenoid 197**.

Upon energization of the solenoid 197 the plunger 198 thereof is actuated toward the left to pivot the levers 192 and 214 clockwise to the "rewind" positions thereof shown in dashed and solid lines respectively in FIGURE 11, and to simultaneously close the holding contacts 233 (FIGURE 14) for continued energization of the solenoid 197 after the circuit through the leads 219 and 220 is interrupted by movement of the metallic layer 216 out of engagement with the contacts 217 and 218. The described pivotal movement of the elongated lever 192, acting through the arm 32 (FIGURE 11) disengages the clutch 29 to interrupt the drive for the take-up reel.

Referring to FIGURE 9, the movement of the lever 192 to "rewind" position, moves the arm 190 toward the right to the dot and dash line "rewind" position thereof. This moves the latch 187 to its dot and dash line position in the path of the adjacent end of the control member 132, and it also moves the links 154 and 150 to their dot and dash line "rewind" positions wherein the shoulder 151 of link 150 is disengaged from the shoulder 149 of the cam and latch plate 146. Upon disengagement of the shoulder 149 from the shoulder 151, the torsion spring 147 pivots the cam and latch plate 146 clockwise to the dot and dash line position thereof shown in FIGURE 9, and such movement of plate 146, by engagement of the pin 145 in notch 148 thereof rotates the eccentric cam 143 counterclockwise sufficiently to bring said cam into driving engagement with the knurled portion 40 of the capstan shaft 35.

The capstan shaft rotates the eccentric cam 143 counterclockwise to thereby effect retractile movement of the control member 132 to the retracted position thereof shown in FIGURE 11. During this movement, the slotted pressure pad actuating lever 183 re-engages the pressure pad pin 108 and actuates the pressure pad 103 to the retracted position thereof shown in FIGURES 4 and 11. Retractile movement of the control member 132 also moves the cam and latch plate 146 into engagement with the pedestal 113, and such engagement during continued retractile movement causes counterclockwise rotation of said plate to the initial position thereof shown in FIGURES 1 and 11 against the bias of the spring 147. Movement of the control member 132 to its retracted position also permits over-center return movement of the toggle linkage comprising link 171 and crank 168 to its initial position shown in FIGURES 1 and 11 under the bias of spring 249. Retractile movement of the control member 132 causes actuation of the latch 187 and arm 57 to the "rewind" positions thereof shown in FIGURE 11, rendering the rewind drive mechanism operative by movement of the parts thereof to the dot and dash line position shown in FIGURE 13. This causes counterclockwise rotation of the supply reel 68 and rewinding of the tape thereon with simultaneous counterclockwise rotation of the take-up reel 28 under the pull thereon exerted by the tape. Movement of the arm 57 to the rewind position of FIGURE 11 moves the projection 225 thereof out of engagement with the head 224 of the sensing plunger 223 permitting said plunger to move into engagement with tape under the light bias of the spring 111.

The rewind operation continues, winding all of the tape 76 and the portion **77*a* of leader 77 onto the supply reel 68 between the flanges 73 and 74 thereof, after which the leader portion 77*b* is wound on the peripheries of said flanges in the annular space between said flanges and the cylindrical inner surface 70*a* of the container 70. As the apertured end of the leader moves past and out of engagement with the tip of the plunger 223, the spring 111 moves said plunger inwardly, causing the tip thereof to move across the opening 100 and into the bore portion 222. This movement of plunger 223 causes opening of the normally closed contacts of the microswitch 226 and, as will be apparent from FIGURE 14, de-energization of the solenoid 197, whereupon the solenoid plunger 198 and its head 200** return from the solid line "rewind" position to the dot and dash line initial position thereof shown in FIGURE 11 under the bias of the spring 199.

The return movement of the plunger 198 upon de-energization of the solenoid 197 causes counterclockwise pivotal movement of the levers 192 and 214 to the dot and dash line initial positions thereof shown in FIGURE 11. This movement of the lever 192, re-engages the clutch 29 through the arm 32 and simultaneously moves the arm 190 to the left to pivot the latch 187 out of engagement with the adjacent end of the control member 132 as indicated in dot and dash lines, whereupon the parts of the rewind drive mechanism shown in FIGURE 13 return to their solid line inoperative position under the bias of the spring 67. This terminates counterclockwise rotation of the supply reel 68 which by now has all of the leader 77 wound thereon and contained wholly within the container 70. The leftward movement of the arm 190 also returns the links 150 and 154 from their solid line "rewind" positions to their initial positions shown in dot and dash lines in FIGURE 11 and also shown in FIGURE 1, wherein the shoulder 151 of link 150 is in latching engagement with the shoulder 149 of the cam and latch plate 146.

Return of the pivotal lever 214 to its initial position on de-energization of the solenoid 197 causes the tip 213 of said lever to engage and actuate the sear 209 which thereupon actuates the arm 205 and link 206 to pivot the latch 128 to the released dot and dash line position thereof shown in FIGURE 11. This permits the sensing and guiding assembly comprising the member 112 and crank 116 to collapse to its initial position shown in FIGURE 1 under the bias of the spring 130, which bias also returns latch 128, link 206, arm 205 and sear 209 to their initial positions shown in FIGURE 1. The threading, playing and rewind cycle is now complete, and all of the parts of the apparatus are in their initial positions shown in FIGURE 1. The cartridge 69 may now be removed from the well 72 and replaced by a selected similar cartridge.

It will be observed that the improved apparatus carries out the threading, play or recording and rewind operations entirely automatically. Further, at any time during a playing or recording operation the apparatus may be switched to a rewind operation at the will of an operator by simply grasping the upstanding pin 194 and moving the same toward the left to thereby move the solenoid plunger 198 and the associated parts to "rewind" position. This closes the holding contacts 233 (FIGURE 14) to energize the solenoid 197, after which the upstanding pin 194 may be released by the operator and the rewind operation will thereafter proceed as aforedescribed, followed by return of the parts to their initial positions shown in FIGURE 1.

FIGURES 15 and 16 illustrate a modification of the recorder-reproducer shown in FIGURES 1 to 14 in which automatic recycling is selectively provided. In FIGURES 15 and 16 the parts indicated by primed reference characters correspond to parts in FIGURES 1 to 14 indicated by the same reference characters unprimed.

In FIGURES 15 and 16 the latch member 160′ is formed with a projecting lug 255, and the member 205′ is formed with a projection 256 formed with a vertical bore 257. A pin 258 has a snug slidable fit within the bore 257 and is movable manually from the raised or retracted position thereof shown in solid lines in FIGURE 16 to the depressed position thereof shown in dot and dash lines in said figure. When the pin 258 is in its raised position, the recorder-reproducer operates in the manner of the form of the invention shown in FIGURES 1 to 14.

Depression of the pin 258 to the dot and dash line position thereof provides for clockwise actuation of the latch 160′ with clockwise actuation of the member 205′ by engagement of the depressed pin 258 with the projecting lug 255. Thus, at the end of the rewind cycle, simultaneously with actuation of the member 205′ to the position of the member 205 shown in dot and dash lines in FIGURE 11 upon de-energization of the solenoid 197, the latch member 160 is disengaged from the shoulder 159 of plate 156′ to initiate a new cycle in the same manner as if said latch were released manually.

Having thus described one specific embodiment of the improved recording and reproducing apparatus, it is to be expressly understood that this embodiment was selected for the purpose of illustration and is not intended to unnecessarily limit the claims or to confine the invention to a particular use. Various changes and modifications may be made in the illustrated embodiment without departing from the spirit of the invention, and all of such changes are contemplated as may come within the scope of the appended claims.

We claim:

1. In combination, a supply reel comprising a hub and spaced parallel circular side flanges, a tape wound on said hub, a stiff leader attached to the free end of said tape, said leader having a wide portion of greater width than the spacing between said reel flanges and wound on the periphery of said flanges, a take-up reel, guiding means defining a predetermined path between said reels, releasable driving means including a driving member adjacent the periphery of said flanges and mounted for pressure contact frictional driving engagement with said leader while the leader is wound on the periphery of said flanges, said driving means being operative when the driving member presses the leader against the periphery of said flanges to rotate the supply reel in an unwinding direction and push the leader off the supply reel and along said predetermined path toward the take-up reel, and means on said take-up reel adapted to engage the leader and to effect winding thereof on the take-up reel upon arrival of the leading end of the leader at the take-up reel.

2. In combination, a supply reel wound with relatively limp tape, a relatively stiff leader attached to the free end of said tape and also wound on said supply reel, a take-up reel, guiding means defining a predetermined path between said reels, driving means including a driving member mounted adjacent the periphery of said supply reel, said driving member being movable between a position affording pressure contact frictional driving engagement with said leader while said leader is wound on said supply reel and a retracted position, said driving means being operative when in driving engagement with said leader to rotate said supply reel in an unwinding direction and push said leader off said supply reel and along said predetermined path toward said take-up reel, means on said take-up reel adapted to engage said leader and to effect winding thereof on said take-up reel upon arrival of the leading end of said leader at said take-up reel, and means for moving said driving member to said retracted position in response to winding of the leader on said take-up reel.

3. In combination, a supply reel wound with limp magnetic recording tape, a relatively stiff leader attached to the free end of said tape and also wound on said supply reel, a take-up reel, guiding means defining a predetermined path between said reels, driving means including a driving member mounted adjacent the periphery of said supply reel for pressure contact frictional driving engagement with said leader while the leader is wound on said supply reel, said driving means being operative while engaging said leader to rotate said supply reel in an unwinding direction and push said leader off said supply reel and along said predetermined path toward said take-up reel, means on said take-up reel adapted to engage said leader and to effect winding thereof on said take-up reel, a pressure roller and a capstan positioned on opposite sides of said predetermined path, a magnetic head positioned adjacent said path, a member engageable with said leader and tape, sensing means engageable with said leader as the same is wound on said take-up reel and connected to said engageable member affording movement of said engageable member upon engagement of said sensing means with said leader, biasing means for moving said engageable member across said predetermined path and thereby moving said tape into recording relation with said head, means for moving said pressure roller into tape driving engagement with said capstan, and means retracting said engageable member and said pressure roller from engaging relation with said tape at the end of recording.

4. In combination, a supply reel wound with relatively limp tape, a relatively stiff leader attached to the free end of said tape and also wound on said supply reel and having a portion of greater width than the tape, a take-up reel, driving means including a driving member adjacent the periphery of said supply reel and mounted for pressure contact frictional driving engagement with said leader while said leader is wound on said supply reel, said driving means being operative when engaging said leader to rotate said supply reel in an unwinding direction and push the leader off the supply reel toward said take-up reel, guiding means defining a predetermined path for said leader between said reels, said guiding means comprising a pair of opposed guiding channel members spaced apart a distance greater than the width of the tape, said channel members being positioned to slidably receive the opposite edge portions only of said leader portion of greater width, the spacing between said channel members preventing any substantial contact of the tape with said members upon passage of said leader portion therepast, and means on said take-up reel adapted to engage said leader to effect winding thereof on said take-up reel upon arrival of the leading end of said leader at said take-up reel.

5. The combination of claim 4 wherein the leading end of said leader is formed with an aperture, and said take-up reel is provided with a spring loaded pin projecting radially from the hub thereof, said pin being engageable in said aperture of the leader.

6. In combination, a supply reel wound with relatively limp tape, a relatively stiff leader attached to the free end of said tape and also wound on said supply reel, said leader having a wide portion of greater width than the tape, a take-up reel, guiding means defining a predetermined path between said reels, said guiding means comprising a pair of opposed guiding members spaced apart a distance greater than the width of the tape and less than the width of said wide leader portion and adapted to slidably retain said wide leader portion in said predetermined path, driving means including a driving member adjacent the periphery of said supply reel and mounted for pressure contact frictional driving engagement with said leader while the leader is wound on the supply reel, said driving means being operative when the driving member engages the leader to rotate said supply reel in an unwinding direction to drive the leader off the supply reel and along said predetermined path toward said take-up reel, and means on said take-up reel adapted to engage the leader and to effect winding thereof on the take-up reel upon arrival of the leading end of the leader at the take-up reel.

7. In combination, a supply reel comprising a hub and spaced parallel circular side flanges, a relatively limp tape wound on said hub, a relatively stiff leader attached to the free end of said tape, said leader having a wide portion having a width greater than the spacing between said reel flanges and wound on the peripheries of said flanges, a take-up reel, guiding means defining a predetermined path between said reels, said guiding means comprising a pair of opposed guiding members spaced apart a distance greater than the width of the tape and less than the width of said wide leader portion and adapted to slidably retain said wide leader portion in said predetermined path, driving means including a driveout roller mounted adjacent the periphery of said supply reel for pressure contact frictional driving engagement with said wide portion of the leader while said portion is wound on said reel flanges, said driving means being operative when the driveout roller engages the leader to rotate said supply reel in an unwinding direction to drive the leader off the supply reel and along said predetermined path toward said take-up reel, means for moving said driveout roller into and out of said driving engagement and being operative when engaging said leader to rotate said supply reel in an unwinding direction to push the leader off the supply reel and along said predetermined path toward the take-up reel, and means on the take-up reel adapted to engage the leader and to effect winding thereof on the take-up reel.

8. In combination, a supply reel wound with limp magnetic recording tape, a relatively stiff leader attached to the free end of said tape and also wound on said supply reel, said leader having a wide portion of greater width than the tape, a take-up reel, guiding means defining a predetermined first path between said reels, said guiding means comprising a pair of opposed guiding members spaced apart a distance greater than the width of the tape and less than the width of said wide leader portion and adapted to slidably retain said wide leader portion in said predetermined first path, a magnetic head spaced from said first path and disposed adjacent a predetermined second path between said reels, driving means including a driving member mounted adjacent the periphery of said supply reel for pressure contact frictional driving engagement with said leader while the leader is wound on the supply reel, said driving member being operative when engaging the leader to rotate said supply reel in an unwinding direction and push the leader off the supply reel and along said predetermined first path toward said take-up reel, means on the take-up reel adapted to engage the leader and to effect a winding thereof on the take-up reel, a member engageable with said leader and tape and having a position adjacent said first path, and means for biasing said engageable member against the leader as said wide leader portion is driven along said first path toward said take-up reel to move the relatively narrow tape to said second path in confronting relation with said head after said wide leader portion has passed said opposed guiding members.

9. Tape transport mechanism comprising a take-up reel, supporting means for operatively positioning a supply reel on which is wound a limp tape and a relatively stiff leader attached to the free end of said tape, which leader has a wide portion of greater width than the tape, guiding means defining a predetermined path between said reels when the supply reel is operatively positioned, said guiding means comprising a pair of opposed guiding members spaced apart a distance greater than the width of a said tape and less than the width of a said wide leader portion and adapted to slidably retain the wide leader portion in said predetermined path, driving means including a retractable driveout roller mounted adjacent said supply reel supporting means for pressure contact frictional driving engagement with the leader while the leader is wound on the supply reel and the supply reel is operatively positioned, said driving means being operative when said driveout roller engages the leader to rotate the supply reel in an unwinding direction to drive the leader off the supply reel and along said predetermined path toward said take-up reel, and means on the take-up reel adapted to engage the leader for effecting winding thereof on the take-up reel upon arrival of the leading end of the leader at the take-up reel.

10. Self-threading magnetic tape recording-reproducing apparatus comprising a take-up reel, supporting means for operatively positioning a supply reel on which is wound a magnetic recording tape and a relatively stiff leader attached to the free end of said tape, which leader has a wide portion of greater width than the tape, guiding means defining a predetermined first path between said reels when the supply reel is operatively positioned, said guiding means comprising a pair of opposed guiding members spaced apart a distance greater than the width of a said tape and less than the width of a said wide leader portion and adapted to slidably retain the wide leader portion in said predetermined first path, driving means including a driveout roller mounted adjacent said supply reel supporting means for pressure contact frictional driving engagement with the leader while the leader is wound on the supply reel and the supply reel is operatively positioned, means for moving said driveout roller into and out of said driving engagement, said driveout roller being operative when engaging the leader to rotate the supply reel in an unwinding direction and push the leader off the supply reel and along said predetermined first path toward said take-up reel, means on the take-up reel adapted to engage the leader to effect winding thereof on the take-up reel, a magnetic head spaced from said first path and disposed adjacent a predetermined second path, a member engageable with the leader and tape and having a position adjacent said first path, means for biasing said engageable member against the leader as the wide leader portion is driven along said first path toward the take-up reel to move the relatively narrow magnetic recording tape to said second path in confronting relation with the magnetic head after the wide leader portion has passed said opposed guiding members.

11. In a machine having a supply reel wound with relatively limp tape, a take-up reel, a releasable forward drive for said take-up reel, and an alternate releasable rewind drive for said supply reel, the combination of guiding means defining a predetermined tape path between said reels, a relatively stiff leader attached to the free end of said tape and also wound on said supply reel, a first control member having a first controlling position and having means biasing the same toward a second controlling position, actuating means for moving said control member toward said first position against said biasing means, releasable means for holding said control member in said first position when moved thereto, releasable driving means including a driveout roller engageable with a portion of said leader on said supply reel for pushing said leader off of said supply reel and along said path, means for effecting winding engagement of said leader on said take-up reel upon transport of the leading end thereof to said take-up reel, means for releasing said holding means for movement of said control member toward its second position, means connected to said driving means and to said control member operative to release said driving means on movement of said control member toward its second position, and control means connected to said forward and rewind drives and to said actuating means and including a second control member movable from a first position to a rewind position in which it effects release of said forward drive, operation of said rewind drive and operation of said actuating means for movement of said first control member toward its first position.

12. In combination, a supply reel wound with relatively limp tape, a relatively stiff leader attached to the free end of said tape and also wound on said supply reel, a take-up reel, guiding means defining a predetermined path between said reels, releasable driving means including a driving member adjacent the periphery of said supply reel and mounted for pressure contact frictional driving engagement with said leader while said leader is wound on said supply reel, said driving means being operative when engaging said leader to rotate said supply reel in an unwinding direction and push said leader off said supply reel and along said predetermined path toward said take-up reel, means on said take-up reel adapted to engage said leader and to effect winding thereof on said take-up reel upon arrival of the leading end of said leader at said take-up reel, means for releasing said driving means, said releasing means comprising a sensing member movably mounted adjacent said take-up reel and having a sensing position in the path of the leader during winding thereof on said take-up reel, engagement of said leader with said sensing member generating an actuating force moving said sensing member toward a retracted releasing position.

13. In combination, a supply reel wound with relatively limp tape, a relatively stiff leader attached to the free end of said tape and also wound on said supply reel, a take-up reel, guiding means defining a predetermined path between said reels, releasable driving means including a driving member adjacent the periphery of said supply reel and mounted for pressure contact frictional driving engagement with said leader while said leader is wound on said supply reel, said driving means being operative when engaging said leader to rotate said supply reel in an unwinding direction and push said leader off said supply reel and along said predetermined path toward said take-up reel, means on said take-up reel adapted to engage said leader and to effect winding thereof on said take-up reel upon arrival of the leading end of said leader at said take-up reel, means for releasing said driving means, said releasing means comprising a sensing member movably mounted adjacent said take-up reel and formed with a cam surface, said sensing member having a sensing position wherein said cam surface is disposed in the path of the leader during winding thereof on said take-up reel, engagement of said leader with said cam surface generating an actuating force moving said sensing member toward a retracted position.

14. In a machine having a supply reel wound with relatively limp tape, a take-up reel, a releasable forward drive for said take-up reel, and an alternate releasable rewind drive for said supply reel, the combination of guiding means defining a predetermined tape path between said reels, a relatively stiff leader attached to the free end of said tape and also wound on said supply reel, releasable driving means including a driveout roller engageable with a portion of said leader on said supply reel for pushing said leader off of said supply reel and along said path, means for effecting winding engagement of said leader on said take-up reel upon transport of the leading end thereof to said take-up reel while said forward drive is operative, means responsive to winding engagement of said leader on said take-up reel for releasing said driving means, said means including a movably mounted sensing member adjacent the periphery of said take-up reel and having a sensing position in the path of said leader during winding thereof on said take-up reel, engagement of said leader with said sensing member generating an actuating force effective to move said member toward a retracted position, means responsive to transport of substantially all of said tape from said supply reel toward said take-up reel for releasing said forward drive and engaging said rewind drive, and means responsive to movement of said tape and leader during rewinding onto said supply reel past a predetermined point between said take-up reel and said supply reel for releasing said rewind drive and returning said sensing member to sensing position.

15. In combination, a supply reel wound with limp tape, a relatively stiff leader attached to the free end of said tape and also wound on said supply reel, a take-up reel, releasable forward drive means for said take-up reel, guiding means defining a predetermined path between said reels, feedout and rewind drive means for said supply reel, said supply reel drive means including a driving member mounted adjacent the periphery of said supply reel for pressure contact frictional driving engagement with said leader while said leader is wound on said supply reel, said supply reel drive means being operative when engaging said leader to rotate said supply reel in an unwinding direction and push said leader off said supply reel and along said predetermined path toward said take-up reel, means on said take-up reel adapted to engage said leader and to effect a winding thereof on said take-up reel, means responsive to winding engagement of said leader on said take-up reel for releasing said supply reel drive means, said releasing means including a movably mounted sensing member adjacent said take-up reel and having a sensing position in the path of said leader during winding thereof on said take-up reel, engagement of said leader with said sensing member generating an actuating force effective to move said sensing member toward a retracted position, means responsive to transport of substantially all of said tape from said supply reel toward said take-up reel for releasing said forward drive means and engaging said rewind drive means, means responsive to movement of said tape and leader during rewinding onto said supply reel past a predetermined point between said take-up reel and supply reel for releasing said rewind drive means, and means operatively associated with said rewind drive means and said sensing member for returning said sensing member to its sensing position upon release of said rewind drive means.

16. In combination, a supply reel wound with relatively limp tape, a relatively stiff leader attached to the free end of said tape and also wound on said supply reel, a take-up reel, guiding means defining a predetermined path between said reels, releasable driving means including a driving member adjacent the periphery of said supply reel and mounted for pressure contact frictional driving engagement with said leader while said leader is wound on said supply reel, said driving means being operative when engaging said leader to rotate said supply reel in an unwinding direction and push said leader off said supply reel and along said predetermined path toward said take-up reel, means on said take-up reel adapted to engage said leader and to effect winding thereof on said take-up reel upon arrival of the leading end of said leader at said take-up reel, a control member having a first controlling position and biased toward a second controlling position, first and second releasable holding means each operative to hold said control member in said first position when moved thereto against said bias, means connected to said driving means and to said control member operative to release said driving means on movement of said control member toward its second position, said connecting means including releasable latch means preventing operation of said driving means except when said latch means is released, there being means interconnecting said second holding means and said latch means for effecting release of said second holding means on release of said latch means.

No references cited.

MARVIN STEIN, *Primary Examiner.*